May 27, 1947.  A. P. DAVIS  2,421,247
MOTION REPRODUCING SYSTEM
Filed Dec. 10, 1935  3 Sheets-Sheet 1

INVENTOR
Arthur P. Davis
BY
August Leary & Campbell
ATTORNEYS

May 27, 1947.   A. P. DAVIS   2,421,247
MOTION REPRODUCING SYSTEM
Filed Dec. 10, 1935   3 Sheets-Sheet 2

INVENTOR
Arthur P. Davis
BY
Hoguet, Neary & Campbell
ATTORNEYS

May 27, 1947.  A. P. DAVIS  2,421,247
MOTION REPRODUCING SYSTEM
Filed Dec. 10, 1935   3 Sheets-Sheet 3
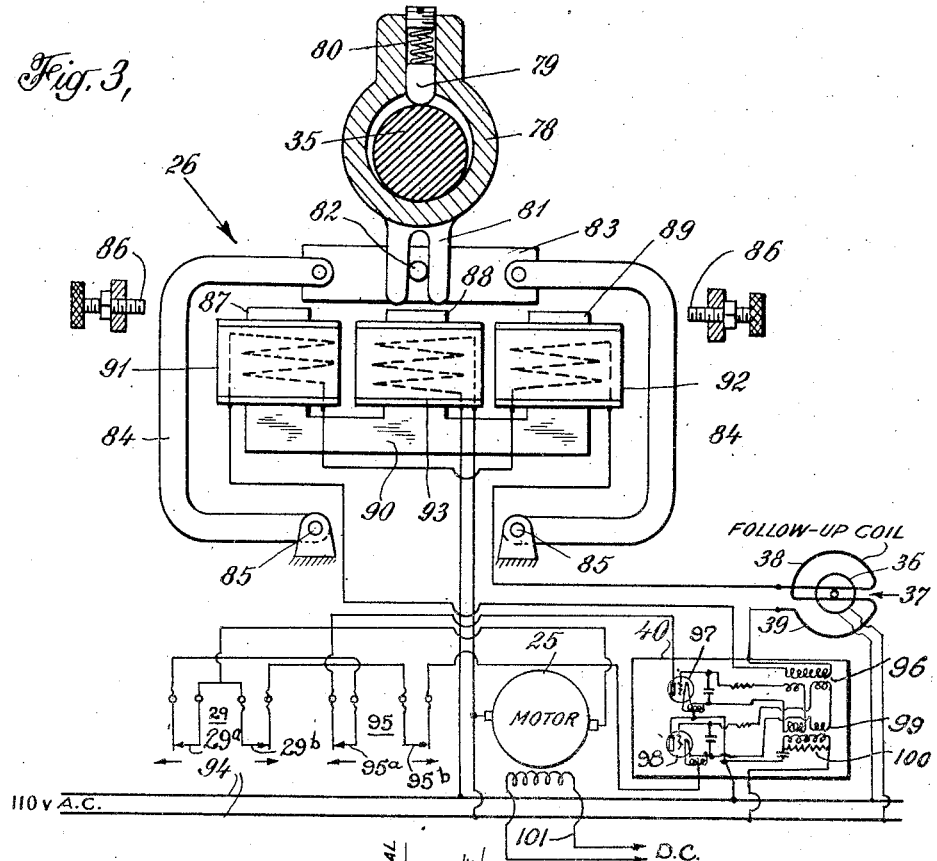
Fig. 3,
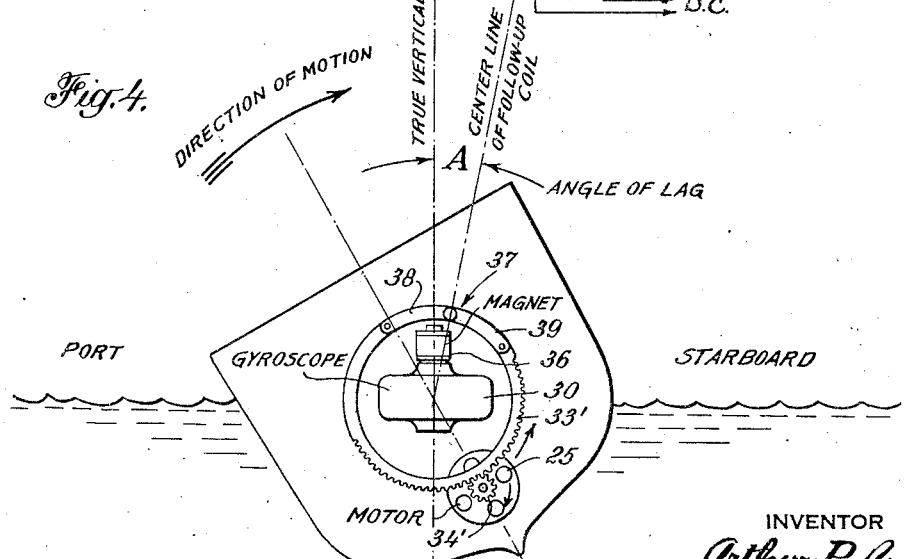
Fig. 4.
INVENTOR
Arthur P. Davis
BY
ATTORNEYS Patented May 27, 1947

2,421,247

UNITED STATES PATENT OFFICE 2,421,247

MOTION REPRODUCING SYSTEM

Arthur P. Davis, New York, N. Y., assignor to Arma Corporation, a corporation of New York Application December 10, 1935, Serial No. 53,736

13 Claims. (Cl. 318—31)

This invention relates to a system for reproducing motion between a controlling object and a controlled object, and has particular reference to a motion reproducing system including a device for compensating for the lag initially required between the following and followed objects in order to initiate an impulse to start the follow-up movement.

The motion reproducing system of this invention may be employed for causing an observation instrument, such as a range-finder or the like, mounted on an unstable support, such as a ship, to follow the relative movements of a stable element, such as a gyroscope, whereby the instrument is stabilized. Assuming, by way of example, that the controlled object is an observation instrument such as a range-finder, and the controlling object a gyroscope, the motion reproducing system includes a follow-up coil, preferably carried by the outer gimbal ring of the gyroscope and having windings located on opposite sides of a base line, representing the even keel position of the vessel. Normally in registry with the base line when the vessel is on an even keel and carried by the gyroscope casing, is an electromagnet, which, when displaced relatively to either of the windings of the follow-up coil by tilting of the outer gimbal ring as the vessel rolls or pitches, induces an electromotive force therein, which, suitably amplified, causes a follow-up motor to rotate in either of two opposite directions.

The follow-up motor is geared directly to the range-finder and drives the latter about its normally horizontal axis in accordance with the displacement between the follow-up coil and the magnet and accordingly stabilizes the range finder. The follow-up motor is also directly geared to the outer gimbal ring carrying the follow-up coil, so that the stabilizing movement imparted to the range finder restores the follow-up coil and the magnet to the neutral stable position, at which point current no longer flows in the follow-up circuit and the follow-up system becomes inactive.

In the arrangement of the present invention the lag between the follow-up coil and the gyroscope electromagnet, which is necessary in order that current may flow in the follow-up circuit, is compensated for by a lag compensating device which is responsive to a change in direction of the roll or pitch of the vessel and causes the follow-up motor to drive the range finder through the angle of lag, whereby the range finder does not lag during the major portion of the roll but is accurately directed upon the selected target.

A manual adjusting handle is provided for rotating the range finder about its horizontal axis for the purpose of directing it upon the target or other remote object, or for following its movement in elevation or depression, and this handle is connected to the range finder and follow-up coil through a differential, so that the displacement of the follow-up coil by the handle results in actuation of the follow-up system to drive the range finder through the angle determined by the observer. Automatic limit switches are provided for preventing the stabilizing means from driving the range finder in elevation against its upper and lower stops which are usually 15° from horizontal, this limit stop mechanism being necessary in the event that the range finder has been adjusted manually to a point in elevation or depression which is so close to the corresponding stop that the angle between the position of the range finder and the stop is less than the angle of roll of the vessel. These limit switches break the circuit of the follow-up motor and automatically restore the circuit when the return roll of the vessel or manual adjustment of the handle release the switches. Similarly, limit switches are provided for the follow-up coil to prevent over-drive thereof. Also, means are provided for disconnecting the stabilizing unit in the event that hand stabiliaztion is to be employed.

It will be seen that with the compensated motion reproducing system of the present invention, range finders and other observation instruments mounted on unstable platforms such as vessels, may be stabilized with a precision which does not interfere with the normal observation of the target or other object being observed, this precision being largely due to the compensation for the lag which is inherent in follow-up systems of the general type described. While the system of this invention is admirably adapted for stabilizing arrangements, it is not limited to that use, but is applicable for reproducing motion for any purpose.

For a more complete understanding of the invention, reference may be had to the following drawings:

Fig. 3 illustrates the lag compensating device; and

Fig. 4 is a schematic representation of the lag between the gyroscope and the follow-up coil when the vessel is rolling.

Figure 1:
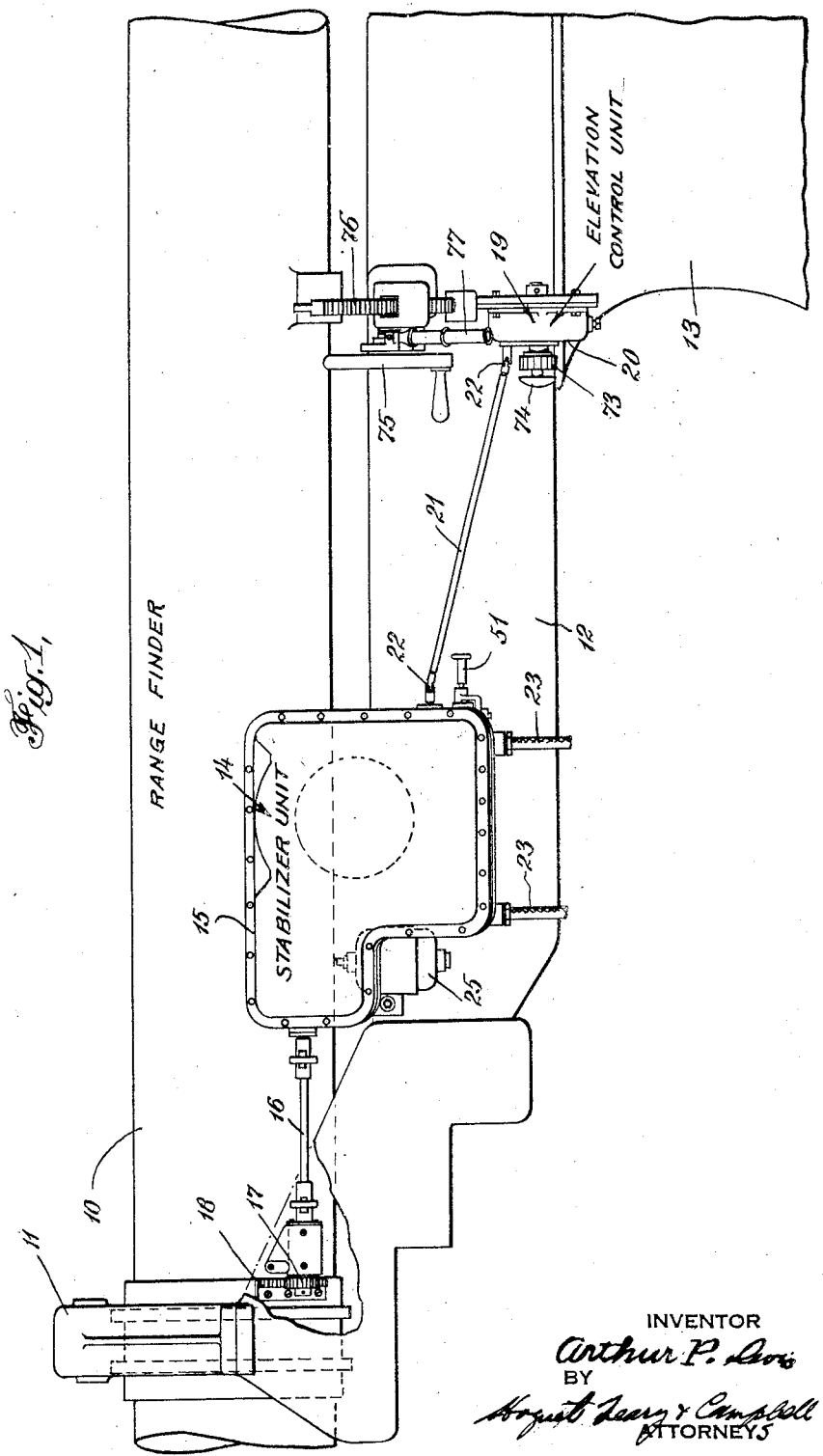
Figure 1 illustrates the invention applied to a range finder stabilizer.

In Fig. 1 of these drawings, numeral 10 designates the naval range finder which rotates about its normal horizontal axis in spaced bearings 11 mounted on the beam 12 of the range finder stand 13, or other suitable support. The stabilizer unit 14 is enclosed in a weatherproof housing 15 secured to the range finder beam 12 near the left hand bearing 11. An operating shaft 16 extends laterally from the housing 15 and is connected by pinion 17 to an elevation sector 18 secured to the range finder 10. Also mounted on the beam 12 adjacent the vertical center of the range finder 10 is the manual control unit 19 enclosed in housing 20 and operatively connected to the stabilizer unit 14 by diagonal shaft 21 through universal joints 22. A follow-up amplifier unit 40, indicated in Fig. 3, located at a remote point, such as on a bulkhead, is connected to the stabilizer unit housing 15 by cables 23.

Figure 2:
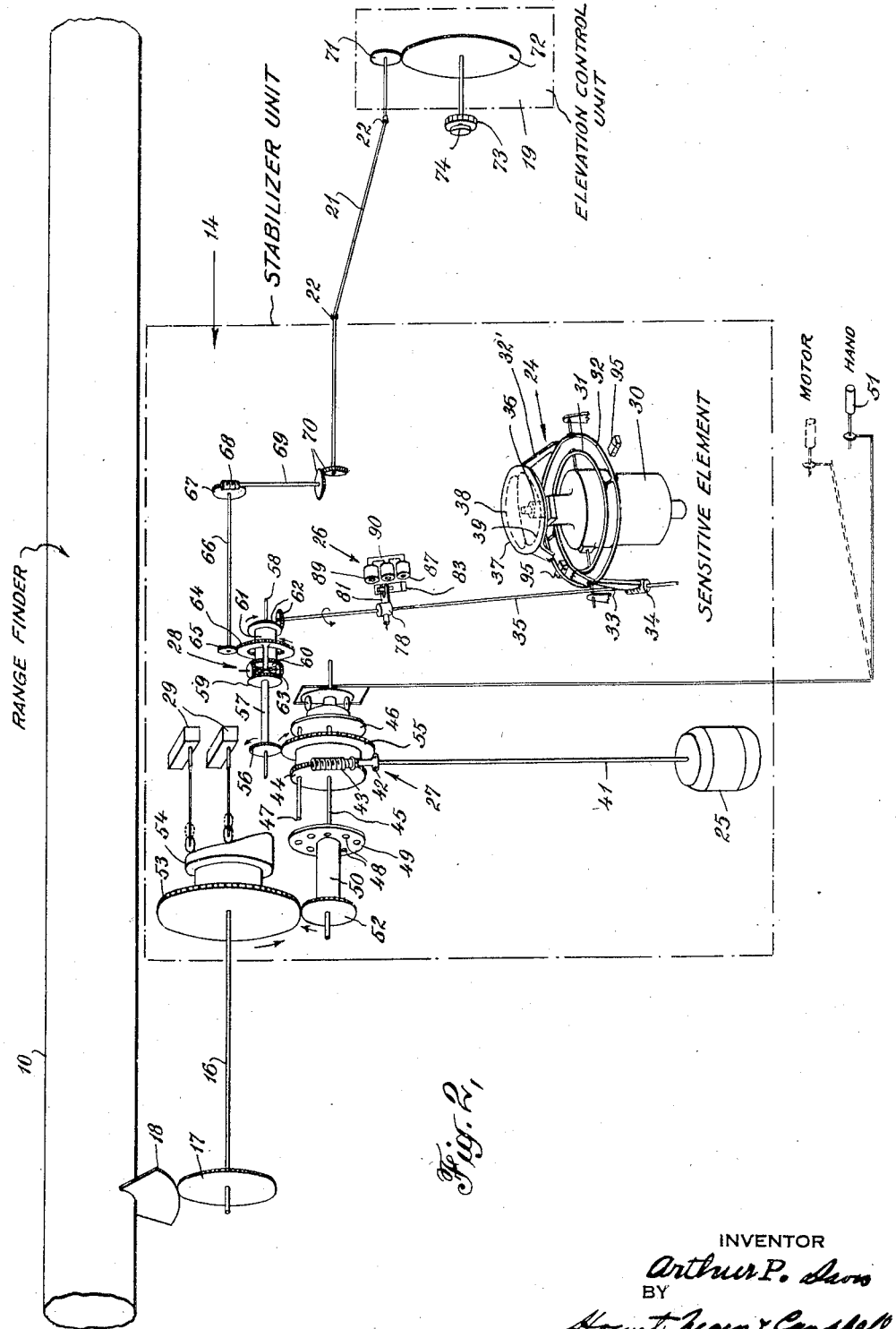
Fig. 2 is a schematic mechanical diagram thereof.

The stabilizer unit 14 enclosed in housing 15 and shown diagrammatically in Fig. 2, includes a gyroscopic sensitive element 24, a follow-up motor 25, a lag compensator 26, a clutch 27 for disconnecting the motor 25 for hand operation of the range finder, a differential 28, limit switches 29 and gearing. The sensitive element 24 comprises a small self-righting gyroscope 30 of any desirable form, equipped with suitable damping means and mounted in inner and outer gimbal rings 31 and 32, respectively, the latter being pivoted on a supporting frame and carrying the worm sector 33 meshing with worm 34 mounted on shaft 35, which is connected through differential 28, clutch 27, shaft 16, and pinion 17 directly to the elevation sector 18 of the range finder 10.

Mounted on a frame 32' carried by outer gimbal ring 32, so as to swing about the pivot thereof, and positioned in inductive relation to an electromagnet 36 carried by the casing of the gyroscope 30, is the follow-up coil 37. The follow-up coil 37 has two windings, 38 and 39, which lie on opposite sides of the vertical plane of the pivot of the outer gimbal ring 32, which extends parallel to the horizontal axis of the range finder 10. The electromagnet 36 is concentric with the vertical spin axis of the gyroscope 30, so that when the vessel is on even keel, the electromagnet 36 and the center line of the follow-up coil lie in the same plane. Displacement of the coil 37 relatively to the electromagnet 36 to either side of the vertical plane, causes an electromotive force to be induced in the corresponding windings 38 or 39. As is indicated diagrammatically in Fig. 3, the windings 38 and 39 are so arranged that the electromotive force induced in winding 38 as the result of relative movement between it and electromagnet 36 is opposite in direction to that induced in winding 39, and these windings are connected by wires in cable 23 to an amplifier 40, which in turn is connected by wires in cable 23 to the follow-up motor 25 so that the motor rotates in either direction, depending upon which of the windings 38 or 39 is energized.

The amplifier 40 may be of any suitable design, such as that illustrated diagrammatically in Fig. 3 by way of example, and in which the voltage output of compensator 26 and/or follow-up coil 37 is impressed on input transformer 96 and applied by its secondaries to the grids of the electronic valves 97 and 98, whose output is impressed upon follow-up motor 25. A bias transformer 99 and phase shifting network 100 are connected to A. C. line 94. Any other suitable form of amplifier 40 may be employed with equal facility.

The connection between electronic valves 97 and 98 includes the limit switches 29 and 95, having contacts 29a, 29b, and 95a, 95b, respectively, which contacts are normally in circuit-closing position. Contacts 29a and 95a are in series in the plate-cathode circuit of tube 97 through the armature of motor 25, so that when either is opened the circuit through tube 97 and motor 25 is broken, thus preventing driving motor 25 clockwise. However, the circuit through armature 25, tube 98, and contacts 29b and 95b remains closed so that when tube 98 passes current the motor 25 will be driven counterclockwise. Likewise, if the motor 25 is being driven counterclockwise and either of contacts 29b and 95b is opened, driving of motor 25 in that direction will be stopped, but the motor 25 will still be connected to be driven clockwise when tube 97 is energized. The field of motor 25 is supplied from D. C. line 101.

The follow-up motor 25 is connected by shaft 41, slip clutch 42, and worm 43 to worm wheel 44 keyed on shaft 45. Slidable through worm wheel 44 and carried by clutch collar 46, which is splined on shaft 45, is a clutch pin 47, adapted to engage in any one of the peripheral openings 48 in a flange 49 on sleeve 50 journalled on shaft 45 as clutch collar 46 is moved to the left by handle 51, which has two designated positions, namely, "Motor" and "Hand," the handle being indicated as set in the latter position in Fig. 2. The engagement of clutch 27 causes the follow-up motor 25 to be directly coupled to the range finder 10 through pinion 52 on collar 50, gear 53, which is keyed on shaft 16, pinion 17, and the elevation segment 18 of range finder 10. Gear 53 carries the crown cam 54, which, when rotated to its high and low points, opens corresponding limit switches 29 in the circuit of the follow-up motor 25 to prevent overdrive of the range finder 10. Upon release of the limit switches 29 by cam 54, they reclose the follow-up motor circuit, being biased to closed position. Cam 54 makes less than one revolution, and is so arranged that when the range-finder approaches its extreme limits in elevation and depression, the rises thereof open the corresponding limit switches 29.

Secured to or formed integrally with worm wheel 44 is a spur gear 55 engaged by a pinion 56 on sleeve 57 journalled on stub shaft 58. Sleeve 57 carries one bevel gear 59 of the differential 28, the opposite bevel gear 60 of which is secured on one end of a sleeve 61 journalled on shaft 58 connected by bevel gears 62 to the follow-up coil shaft 35. The spider 63 of the differential 28 is carried by spur gear 64 secured to shaft 58 and meshing with pinion 65 on shaft 66 having the worm wheel 67. A worm 68 on short shaft 69 drives worm wheel 67 through bevel gears 70 from diagonal shaft 21 leading to the elevation control unit 19. This unit includes a pinion 71 on shaft 21 meshing with a gear 72 connected by handle 73 provided with a hand-rest knob 74. As is illustrated in Fig. 1, the usual handwheel 75 for manual operation of the range finder 10 is geared by a pinion to the elevation sector 76. A clutch is interposed between the handwheel 75 and its pinion and may be disengaged by lever 77 to prevent the handwheel 75 from spinning when the stabilizer unit 14 is in operation.

The lag compensator 26 illustrated in Fig. 3 includes a loose collar 78 on follow-up coil shaft 35 having a friction brush 79 urged into engagement with shaft 35 by spring 80, so as to turn with shaft 35 as the latter reverses its direction of rotation, and having a fork 81 spanning a pin 82 mounted on a magnetic armature 83. The armature 83 is supported on parallel links 84 pivoted at 85 on a suitable support and limited in their lateral movements by adjustable stops 86, so that as armature 83 is actuated by shaft 35, it moves substantially parallel to the faces of the poles 87, 88 and 89 of a magnetic core piece 90. The coils 91 and 92 on the respective outer poles 87 and 89, although opposing, are connected in series with each other and with the windings 38 and 39 of the follow-up coil 37. For proper operation the primary coil 93 on center pole 88 is energized from the same alternating current source as electromagnet 36, such as the 110-volt line 94, because the phase relationship of the current flowing through them must be fixed.

The range finder stabilizer of this invention is placed into operation by shifting control handle 51 on the casing 15 of the stabilizer unit 14 to "Motor" position, which effects engagement of clutch 27, thus connecting sensitive element 24, follow-up motor 25 and elevation control unit 19 directly to the range finder 10 through gears 52 and 53, shaft 16, pinion 17, and sector 18. The sensitive element 24 immediately assumes control, for any rolling or pitching of the vessel causing relative displacement of the follow-up coil 37 out of the true vertical plane in which the electromagnet 36 is held by the gyroscope 30 (Fig. 4), induces an electromotive force in the corresponding winding 38 or 39 of the follow-up coil which, suitably amplified by amplifier 40, causes the follow-up motor 25 to rotate in the corresponding direction to restore the follow-up coil 37 to its neutral position with respect to electromagnet 36 where current no longer flows in the follow-up system. This follow-up movement is effected by motor 25 through slip clutch 42, worm 43, worm wheel 44, gear 55, pinion 56, sleeve 57, bevel gear 59 of differential 28, the gears of the spider 63 thereof, opposite differential bevel gear 60, sleeve 61, bevel gears 62, follow-up coil shaft 35, worm 34, sector 33, outer gimbal ring 32 and follow-up coil 37. At the same time, this follow-up movement is imparted to the directly connected range finder 10 through clutch 27, gears 52 and 53, shaft 16, pinion 17 and range finder segment 18, causing the range finder 10 to rotate about its horizontal axis through the vertical angle of roll or pitch so as to automatically keep the range finder sighted on the selected target.

The manual adjustment of the range finder by the observer in bringing the instrument to bear on the selected target or in following any movement thereof in elevation or depression, is superimposed upon the stabilizing movement imparted to the range finder by the stabilizer unit 14. This manual adjustment is effected by the rotation of handle 73 of elevation control unit 19, which, through gears 72 and 71, diagonal shaft 21, gears 70, shaft 69, worm and wheel 68, 67, shaft 66, pinion 65 and gear 64 causes the spider 63 of differential 28 to roll around on locked bevel gear 59 through the appropriate angle to rotate opposite differential bevel gear 60, sleeve 61, bevel gears 62, follow-up coil shaft 35, worm 34, and worm sector 33 to tilt outer gimbal ring 32, so that follow-up coil 37 is displaced relatively to the stabilized electromagnet 36. This energizes the follow-up system to restore the follow-up coil 37 to neutral position and in so doing, it simultaneously rotates the range finder 10 through the appropriate angle in the manner described. If this manual adjustment brings range finder to a point near one of its extreme positions of elevation or depression, say 14°, and the subsequent stabilizing movement tends to exceed one degree, making the total angle substantially equal to the maximum angle of elevation or depression, say 15°, the cam 54 opens the corresponding limit switch 29 to break the follow-up circuit and stop the rotation of the follow-up motor in that direction before it drives the rangefinder against the corresponding stop. The opening of either limit switch 29 does not prevent the follow-up motor 25 from rotating in the opposite direction, so that subsequent return movements of the follow-up mechanism release the open limit switch and restore the circuit for resumed rotation of the motor in the said direction. Similarly, upper and lower limit switches 95 are provided for actuation by opposite sides of the outer gimbal ring 32 of the sensitive element 24 to prevent overdrive of the follow-up coil 37.

Inasmuch as there must be a relative displacement between the electromagnet 36 and the follow-up coil 37 before current will flow in the follow-up circuit, it follows that the follow-up coil 37 lags the electromagnet 36 by the angle A indicated in Fig. 4, and, since the follow-up coil 37 is directly geared to the range finder 10, the stabilizing movement of the range finder would lag behind the pitch or roll of the vessel unless compensated for. The lag compensator 26 is an auxiliary device which corrects this condition by introducing a small constant electromotive force in the follow-up circuit, which is substantially equal to that resulting from the lag, so that the motor 25 drives the follow-up coil 37 through the angle of lag in registry with the electromagnet 36 and then continues to drive the follow-up coil and range finder through the remainder of the roll in that direction. Thus, with compensation, the target would be momentarily shifted only at each reversal in direction of roll, with substantially no displacement during the major part of the roll.

By way of specific illustration, if compensation is omitted and the vessel rolls to starboard from the horizontal position of rest, where coil 37 is opposite magnet 36 so that no electromotive force is induced therein, the follow-up coil 37 is carried through the angle of lag A and the follow-up motor 25 starts and continues to drive the follow-up coil 37 by means of gears 33' and 34' in the opposite direction or to port as long as relative movement between the follow-up coil and the electromagnet continues, in order to keep the follow-up coil 37 sensibly opposite the electromagnet 36. This lag is thus maintained until reversal of roll, when coil 37 must first move back over magnet 36, through the same angle which has now become lead, then to the other side through the angle of lag when the follow-up mechanism is again energized. This lag is again maintained until the next reversal of roll.

With compensation the sequence of operations is as follows: Assume that the ship is at rest on even keel with stabilizer parts in normal position as shown in Figs. 2 and 3, i. e., with armature 83 in center position so that there is no output E. M. F. from the series opposite coils 91 and 92. Coil 37 is centered opposite magnet 36 so that no E. M. F. is induced therein. As the ship begins to roll to starboard, for example, coil 37 must move away from magnet 36 through the angle of lag before motor 25 is energized sufficiently to operate the follow-up, as in the previous case. As the follow-up motor starts, the follow-up coil shaft 35, rotating counter-clockwise as indicated in Fig. 2, turns the collar 78 in that direction due to the friction of brush 79, so as to move armature 83 to the right on its links 84 against right hand stop 86, as seen in Fig. 3, resulting in a greater E. M. F. being induced in coil 92 than in coil 91. A resultant E. M. F. is thus furnished to coil 37, which is constant until rotation of shaft 35 is reversed, and is of proper phase to aid the lag E. M. F. in coil 37. This increased input E. M. F. to amplifier 40 causes greater power output therefrom to motor 25, resulting in momentary increase in its speed which brings coil 37 substantially in registry with magnet 36. By design, the compensation and lag E. M. F.'s are equivalent, so motor 25 continues to rotate with no lag E. M. F. until reversal of the roll. The range finder 10 is accordingly kept sighted accurately on the target throughout the remainder of the roll. At the limit of the roll, when the ship stops prior to its reversal, motor 25, being still energized by lag compensator 26, rotates coil 37 past magnet 36 by an angle of lead which is equal to the angle of lag, before the compensation E. M. F. is exactly opposed by the lag E. M. F. now induced in coil 37, so that motor 25 is de-energized. As the return roll commences, coil 37 is further carried away from magnet 36 until displacement reaches double the original angle of lag, when the E. M. F. induced in coil 37 is sufficient to again rotate motor 25 in the opposite direction. This reversal of motor 25 is transmitted to shaft 35, causing lag compensator armature 83 to shift from right hand stop 86 to left hand stop 85, so that greater E. M. F. is now induced in coil 91 than in coil 92, which reverses the phase of the resultant E. M. F. so it now aids lag E. M. F. in coil 37 instead of opposing it. Motor 25 now receives greater input through amplifier 40, and accordingly momentarily speeds up to rotate coil 37 through the lag angle, which is double the original lag angle, to again come in registry with magnet 36, where it remains until the next reversal of the roll. At each reversal of the compensator armature 83, the electromotive force induced is such as to run the motor 25 in the direction to which it has started. In order to prevent sudden application of the compensating electromotive force, which would result in a rapid acceleration of the motor 25, causing follow-up coil 37 to overshoot the electromagnet 36 with consequent hunting, the compensator is arranged so that the lag compensating voltage is introduced in the follow-up circuit gradually and after the follow-up coil has rotated through an angle equal to several times the angle of lag.

When the range finder 10 is to be operated wholly manually, handle 51 on the stabilizer casing 15 is shifted from "Motor" to "Hand" position, resulting in disconnection of the sensitive element 24 and the follow-up system from the range finder 10 by means of clutch 27. The engagement of the clutch of handwheel 75 by means of handle 77 enables manual operation of the range finder 10 in the usual way.

The slip clutch 42 in the shaft 41 between the gearing and the follow-up motor 25 slips if the gear train is suddenly stopped for some reason, thus preventing undue strain. It will be observed that the gearing from the follow-up motor worm 43 to the range finder are positively coupled together.

Although the stabilizing device of this invention has been illustrated and described as applied to a range finder, it is to be understood that it is susceptible of use on any fire-control or other instrument requiring stabilization and, further, that the lag compensator is applicable to follow-up systems generally.

Also, although the compensator is illustrated and described as operating inductively with a transformer coupling device, equivalent arrangements may be employed with equal facility. Likewise, equivalent detecting arrangements for the follow-up system may be employed.

I claim:

1. In a system for reproducing motion between a controlling object and a controlled object, the combination of cooperating electrical elements severally connected to said objects for movement therewith, electrical means responsive to a predetermined distance of displacement of the controlling object element relatively to the controlled object element, a motor energized by said means, operative connections between said motor and said controlled object for driving the latter to follow the relative movement of said controlling object, and electrical means responsive to an initial movement of said controlled object for additionally energizing said motor to drive said controlled object through said displacement distance and maintaining the motor energized to continue to drive said controlled object in the same direction independently of the relative positions of said electrical elements.

2. In a system for reproducing motion between a controlling object and a controlled object, the combination of cooperating electrical elements severally connected to said objects for movement therewith, electrical means responsive to a predetermined distance of displacement of the controlling object element relatively to the controlled object element, a motor energized by said means, operative connections between said motor and said controlled object for driving the latter to follow the relative movement of said controlling object, and means responsive to an initial movement of said controlled object for additionally energizing said motor to increase its speed and drive said controlled object through the said displacement distance into registry with said controlling object independently of the relative positions of said electrical elements.

3. In a system for reproducing motion between a controlling object and a controlled object, the combination of cooperating electrical elements severally connected to said objects for movement therewith, electrical means responsive to a predetermined distance of displacement of the controlling object element relatively to the controlled object element, a motor energized by said means, operative connections between said motor and said controlled object for driving the latter to follow the relative movement of said controlling object, and means responsive to an initial movement of said controlled object for additionally energizing said motor to drive said controlled object into registry with said controlling object and thereafter maintain said motor energized to maintain said object in registry during the movement of the controlling object in the same direction independently of the relative positions of said electrical elements.

4. In a system for reproducing motion between a controlling object and a controlled object, the combination of cooperating electrical elements severally connected to said objects for movement therewith, electrical means responsive to a predetermined distance of displacement of the controlling object element relatively to the controlled object element, a motor energized by said means, operative connections between said motor and said controlled object for driving the latter to follow the relative movement of said controlling object, and electrical means actuated by initial movement of said controlled object for appropriating control of said first means to maintain said motor energized to continue to drive said controlled object in the same direction independently of the relative positions of said electrical elements.

5. In a system for reproducing motion between a controlling object and a controlled object, the combination of cooperating electrical elements severally connected to said objects for movement therewith, electrical means responsive to a predetermined distance of displacement of the controlling object element relatively to the controlled object element, a motor energized by said means, operative connections between said motor and said controlled object for driving the latter to follow the relative movement of said controlling object, and means responsive to an initial movement of said controlled object by said motor for imparting an additional movement to said controlled object to compensate for the said displacement independently of the relative positions of said electrical elements.

6. In a system for reproducing motion between a controlling object and a controlled object, the combination of cooperating electrical elements severally connected to said objects for movement therewith, electrical means responsive to a predetermined distance of displacement of the controlling object element relatively to the controlled object element, a motor energized by said means, operative connections between said motor and said controlled object for driving the latter to follow the relative movement of said controlling object, and means responsive to an initial movement of said controlled object by said motor for temporarily impressing an additional voltage on said motor to momentarily increase its speed to drive said controlled object through said displacement distance independently of the relative positions of said electrical elements.

7. In a system for reproducing motion between a controlling object and a controlled object, the combination of an electrical follow-up mechanism responsive to a predetermined displacement distance between said objects for developing a corresponding voltage, an electric motor energized by said voltage for driving said controlled object to follow said controlling object by the displacement distance, and electrical means responsive to an initial movement of said motor for increasing the voltage in the circuit of said motor to drive said controlled object through said displacement distance into registry with said controlling object independently of the relative positions of said objects.

8. In a system for reproducing motion between a controlling object and a controlled object, the combination of an electrical follow-up mechanism responsive to a predetermined displacement distance between said objects for developing a corresponding voltage, an electric motor energized by said voltage for driving said controlled object to follow said controlling object by the displacement distance, and electrical means in the circuit of said motor and actuated mechanically by the initial movement of said controlled object for impressing an additional voltage on said motor to increase its speed to drive said controlled object through said displacement distance into registry with said controlling object.

9. In a system for reproducing motion between a controlling object and a controlled object, the combination of an electrical follow-up mechanism responsive to a predetermined displacement distance between said objects for developing a corresponding voltage, an electric motor energized by said voltage for driving said controlled object to follow said controlling object by the displacement distance, and electrical means in the circuit of said motor and actuated mechanically by the initial movement of said controlled object for first increasing and then restoring the magnitude of the voltage in the motor circuit whereby the motor temporarily increases its speed to move said controlled object through said displacement distance and then maintain said objects in registry during the remainder of the movement of the controlling object in the same direction.

10. In a system for reproducing motion between a controlling object and a controlled object, the combination of an electrical follow-up mechanism responsive to a predetermined displacement distance between said objects for developing a corresponding voltage, an electric motor energized by said voltage for driving said controlled object to follow said controlling object by the displacement distance, and electrical means responsive to an initial movement of said controlled object for introducing a substantially constant voltage in the circuit of said motor independently of the first-named voltage, whereby the voltage in the motor circuit is increased until the motor moves said controlled object through said displacement distance and maintains the latter in registry with said controlling object as long as the latter moves in the same direction independently of the relative positions of said objects.

11. In a system for reproducing motion between a controlling object and a controlled object, the combination of an electrical follow-up mechanism responsive to a predetermined displacement distance between said objects for developing a corresponding voltage, an electric motor energized by said voltage for driving said controlled object to follow said controlling object by the displacement distance, an inductive device, in the control circuit of said motor, and means actuated by an initial movement of said controlled object for producing a substantially constant voltage in said inductive device to increase the motor speed for driving said controlled object through said displacement distance and then continuing to drive the same in substantial registry with said controlling object as long as movement of the latter continues in the same direction independently of the relative positions of said objects.

12. In a system for reproducing motion between a controlling object and a controlled object, the combination of an electrical follow-up mechanism responsive to a predetermined displacement distance between said objects for developing a corresponding voltage, an electric motor energized by said voltage for driving said controlled object to follow said controlling object by the displacement distance, electrical means responsive to an initial movement of said controlled object in one direction for additionally energizing said motor to move said controlled object through said displacement distance and thereafter maintain energization of said motor to continue to actuate the controlled object in the same direction, and second electrical means responsive to a reversal of direction of said controlled object in response to a second displacement between said objects in the opposite direction for additionally energizing said motor to move said controlled object through the distance of said second displacement and thereafter maintain energization of said motor to continue to actuate the controlled object in said opposite direction.

13. In a system for reproducing motion between a controlling object and a controlled object, the combination of an electrical follow-up mechanism responsive to a predetermined displacement distance between said objects for developing a corresponding voltage, an electric motor energized by said voltage for driving said controlled object to follow said controlling object by the displacement distance, said motor being reversible and the voltage developed by said mechanism having a sense depending upon the direction of relative movement between said objects, a pair of series-connected coils in the control circuit of said motor, and an armature operatively connected to said motor for movement in opposite directions into coupled relation with either of said coils as the motor rotation reverses for impressing an additional voltage of corresponding sense on the motor to temporarily increase its speed to move said controlled object through said displacement distance and maintain the latter in registry with said controlling object as long as the latter continues to move in the same direction independently of the relative positions of said objects.

ARTHUR P. DAVIS.

REFERENCES CITED

The following references are of record in the file of this patent:

UNITED STATES PATENTS

| Number | Name | Date |
|---|---|---|
| 2,056,348 | Edwards | Oct. 6, 1936 |
| 1,731,776 | Henry | Oct. 15, 1939 |
| 1,924,688 | Anschutz | Aug. 29, 1933 |
| 1,684,138 | Nixdorff | Sept. 11, 1928 |
| 1,798,592 | Davis | Mar. 31, 1931 |
| 1,684,137 | Mittag | Sept. 11, 1928 |

FOREIGN PATENTS

| Number | Country | Date |
|---|---|---|
| 350,955 | Great Britain | June 11, 1931 |
| 20,373 | Great Britain | 1910 |